United States Patent
Brandt et al.

(10) Patent No.: US 6,578,368 B1
(45) Date of Patent: Jun. 17, 2003

(54) CRYOGENIC COOLING OF EXTRUDED AND COMPRESSION MOLDED MATERIALS

(75) Inventors: Jeffrey R. Brandt, Blacklick, OH (US); Matthew F. Kollar, Powell, OH (US); Herbert L. Hutchison, Blacklick, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 09/766,054

(22) Filed: Jan. 19, 2001

(51) Int. Cl.[7] .............................................. F25D 13/06
(52) U.S. Cl. ....................................................... 62/63
(58) Field of Search .............................. 62/62, 63, 378

(56) References Cited

U.S. PATENT DOCUMENTS

| | | | |
|---|---|---|---|
| 2,010,207 A | 8/1935 | Topham et al. ............... 18/15 |
| 2,514,471 A | 7/1950 | Calhoun .......................... 18/8 |
| 3,308,507 A | 3/1967 | Black ............................ 18/12 |
| 4,054,632 A | 10/1977 | Franke ....................... 264/145 |
| 4,192,839 A | 3/1980 | Hayashi et al. ............. 264/45.5 |
| 4,221,621 A | 9/1980 | Seki et al. ..................... 156/78 |
| 4,663,107 A | * 5/1987 | Takada et al. ............... 264/519 |
| 5,137,673 A | 8/1992 | Bourcier et al. ............. 264/151 |
| 5,516,472 A | 5/1996 | Laver .......................... 264/118 |
| 5,597,586 A | 1/1997 | Wilson et al. ................. 425/67 |
| 5,730,914 A | * 3/1998 | Ruppman, Sr. ............... 264/28 |
| 5,827,462 A | 10/1998 | Brandt et al. ............... 264/179 |
| 6,323,279 B1 | * 11/2001 | Gunthergerg et al. ......... 525/70 |

* cited by examiner

Primary Examiner—William C. Doerrler
Assistant Examiner—Malik N. Drake
(74) Attorney, Agent, or Firm—Standley & Gilcrest LLP

(57) ABSTRACT

The present invention relates to a system and a method for cooling extruded and molded materials. The present invention is especially useful to cool the hollows found in many extrudates. Hollows may be created in order to reduce material, weight and/or processing time. A fluid below about 40 degrees Fahrenheit is released into the hollow so as to cool the material and to assist in solidification. Additionally, the exterior of the molded material may be subjected to the cooling fluid so as to cool the material and to assist in solidification. Cooling may be further augmented by conventional methods such as a water bath. Increases in production line throughput may result by rapidly cooling the molded material. Other uses for the present invention include injection molding, compression molding, gas assist molding, and co-extrusion.

19 Claims, 6 Drawing Sheets

CRYOGENIC COOLING OF EXTRUDED AND COMPRESSION MOLDED MATERIALS

BACKGROUND AND SUMMARY OF THE INVENTION

The present invention relates generally to a system and method for cooling manufactured articles and, more particularly, to a system and method for cooling extruded and molded materials with a fluid that is below about 40 degrees Fahrenheit. The present invention may also be used in other types of manufacturing techniques in which the output or material must be cooled from a heated state. The present invention includes a system and method for cooling synthetic wood composite materials including, but not limited to, cellulosic-filled plastic composites. In addition, the present invention may also be used to cool other types of pure or mixed materials including, but not limited to, plastics, polymers, foamed plastics, plastic compositions, inorganic-filled plastic compositions, metals, metallic compositions, alloys, mixtures including any of the aforementioned materials, and other similar, conventional, or suitable materials that need to be cooled after being processed. For instance, the present invention may be used to cool polyvinyl chloride (PVC) products and products made from other plastics.

For several reasons, there is a need to find materials that exhibit the look and feel of natural wood. The supply of wood in the world's forests for construction and other purposes is dwindling. Consequently, the supply of wood from mature trees has become a concern in recent years, and the cost of wood has risen. As a result, several attempts have been made by others to find a suitable wood-like material.

Cellulosic/polymer composites have been developed as replacements for all-natural wood, particle board, wafer board, and other similar materials. For example, U.S. Pat. Nos. 3,908,902, 4,091,153, 4,686,251, 4,708,623, 5,002,713, 5,055,247, 5,087,400, 5,151,238, 6,011,091, and 6,103,791 relate to processes and/or compositions for making wood replacement products. As compared to natural woods, cellulosic/polymer composites offer superior resistance to wear and tear. In addition, cellulosic/polymer composites have enhanced resistance to moisture, and it is well known that the retention of moisture is a primary cause of the warping, splintering, and discoloration of natural woods. Moreover, cellulosic/polymer composites may be sawed, sanded, shaped, turned, fastened, and finished in the same manner as natural woods. Therefore, cellulosic/polymer composites are commonly used for applications such as interior and exterior decorative house moldings, picture frames, furniture, porch decks, deck railings, window moldings, window components, door components, roofing structures, building siding, and other suitable indoor and outdoor items. However, many attempts to make products from cellulosic/polymer composite materials have failed due to poor or improper manufacturing techniques.

In the present invention, a product or article is manufactured by a desired technique such as, but not limited to, extrusion, compression molding, injection molding, or other similar, suitable, or conventional manufacturing techniques. The product is then cooled by subjecting it to a fluid that is below about 40 degrees Fahrenheit. The present invention can be used alone or in conjunction with other known or later developed cooling methods. Accordingly, the present invention can more thoroughly and efficiently cool the manufactured product or article to a desired level. This can lead to faster production times as well as a product having improved structural, physical, and aesthetic characteristics.

In addition to the novel features and advantages mentioned above, other objects and advantages of the present invention will be readily apparent from the following descriptions of the drawings and preferred embodiments.

DETAILED DESCRIPTION OF EXEMPLARY EMBODIMENT(S)

The present invention is directed to a system and method for cooling manufactured articles or products. It is not intended to limit the present invention to particular manufacturing techniques or particular materials. The present invention may be used to cool articles or products made by variety of different manufacturing techniques. Examples of manufacturing techniques that may utilize the present invention include, but are not limited to, extrusion (including co-extrusion), compression molding, injection molding, and other known, similar, or conventional techniques for manufacturing products or articles from plastic, wood, metal, mixtures of these materials, or other materials used to make products.

The present invention is particularly useful for cooling plastics, polymers, and cellulosic/polymer composite materials that have been extruded or molded. The materials that may be used to make cellulosic/polymer composites include, but are not limited to, cellulosic fillers, polymers, plastics, thermoplastics, inorganic fillers, cross-linking agents, lubricants, process aids, stabilizers, accelerators, inhibitors, enhancers, compatibilizers, blowing agents, foaming agents, thermosetting materials, and other similar, suitable, or conventional materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, and other similar materials. In addition to PVC, examples of polymers include multilayer films, high density polyethylene (HDPE), polypropylene (PP), low density polyethylene (LDPE), chlorinated polyvinyl chloride (CPVC), acrylonitrile butadiene styrene (ABS), ethyl-vinyl acetate, other similar copolymers, other similar, suitable, or conventional thermoplastic materials, and formulations that incorporate any of the aforementioned polymers. Examples of inorganic fillers include talc, calcium carbonate, kaolin clay, magnesium oxide, titanium dioxide, silica, mica, barium sulfate, acrylics, and other similar, suitable, or conventional materials. Examples of thermosetting materials include polyurethanes, such as isocyanates, phenolic resins, unsaturated polyesters, epoxy resins, and other similar, suitable, or conventional materials. Combinations of the aforementioned materials are also examples of thermosetting materials. Examples of lubricants include zinc stearate, calcium stearate, esters, amide wax, paraffin wax, ethylene bis-stearamide, and other similar, suitable, or conventional materials. Examples of stabilizers include tin stabilizers, lead and metal soaps such as barium, cadmium, and zinc, and other similar, suitable, or conventional materials. In addition, examples of process aids include acrylic modifiers and other similar, suitable, or conventional materials.

Figure 1:
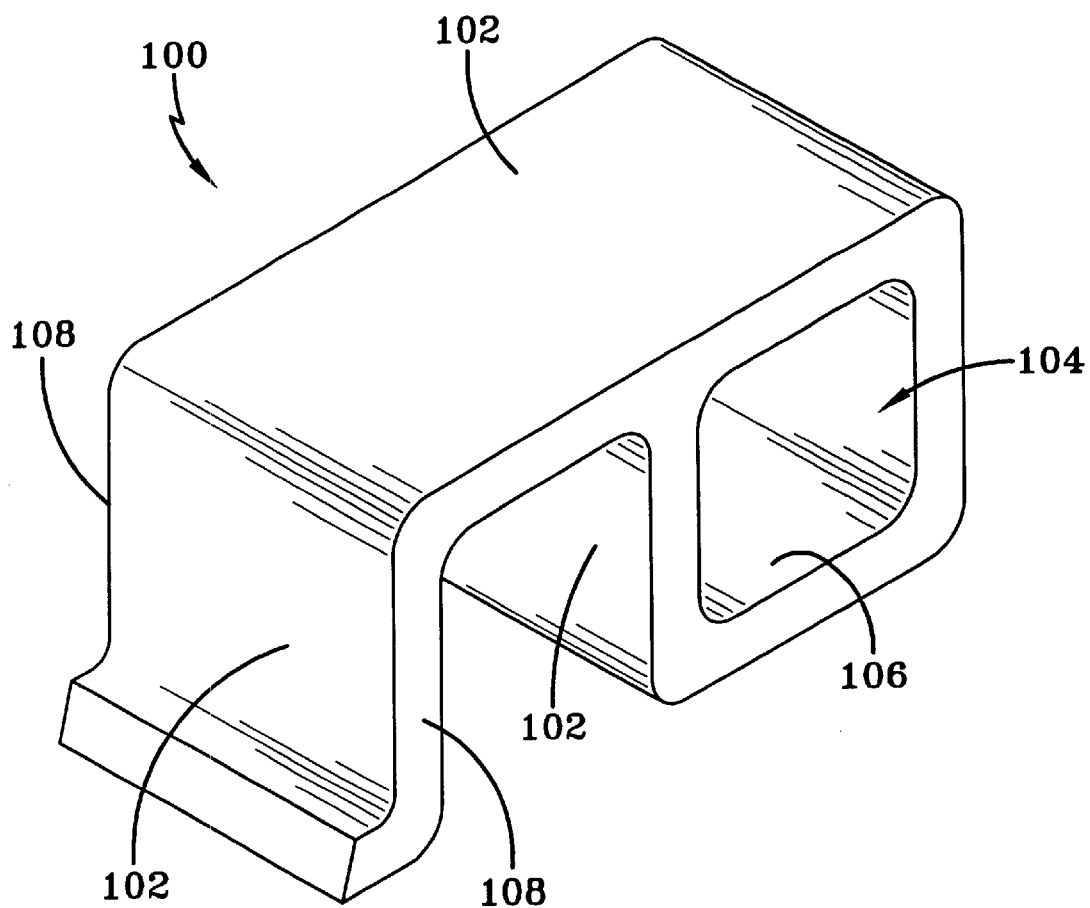
FIG. 1 is a cross sectional view of an extrudate.

FIG. 1 shows one example of an extrudate 100 that may be cooled by the present invention. The extrudate 100 includes an exterior surface 102, a hollow 104, an interior surface 106, and two ends 108. The exterior surface 102 may be cooled by a traditional method such as using a warm water bath or water mist. However, the interior surface 106 may not be sufficiently cooled by many traditional methods because the surface may not be available for contact with the cooling medium. The interior surface 106 defines the boundary of the hollow 104. The interior surface 106 may be accessed from either end 108. The interior surface 106 may not be cooled to a desired level within a desired amount of time by externally applied coolants.

Figure 2:
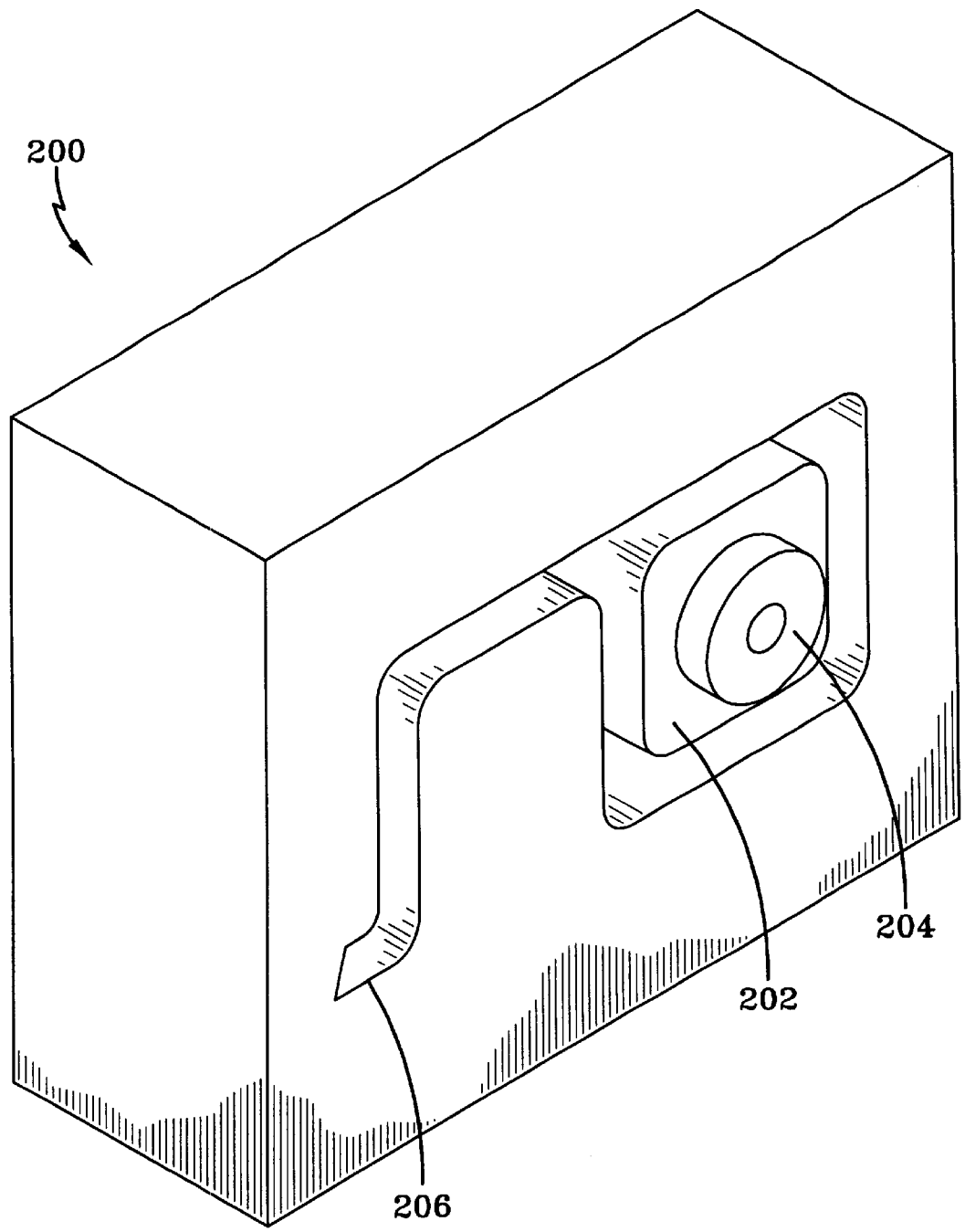
FIG. 2 is a view of an extrusion die showing the location of the cryogenic nozzle.

FIG. 2 shows one example of an extrusion die 200 adapted with the present invention. The extrusion die 200 defines the cross section of the extrudate by the shape of the profile form 206. Hollows in the cross section of the extrudate are each formed with a standing core 202. The standing core 202 is fitted with a nozzle 204. The nozzle 204 is adapted to connect with a source of the cooling fluid (not shown). The nozzle 204 is oriented to spray into the hollow formed in the extrudate cross section by the standing core 202.

Figure 3:
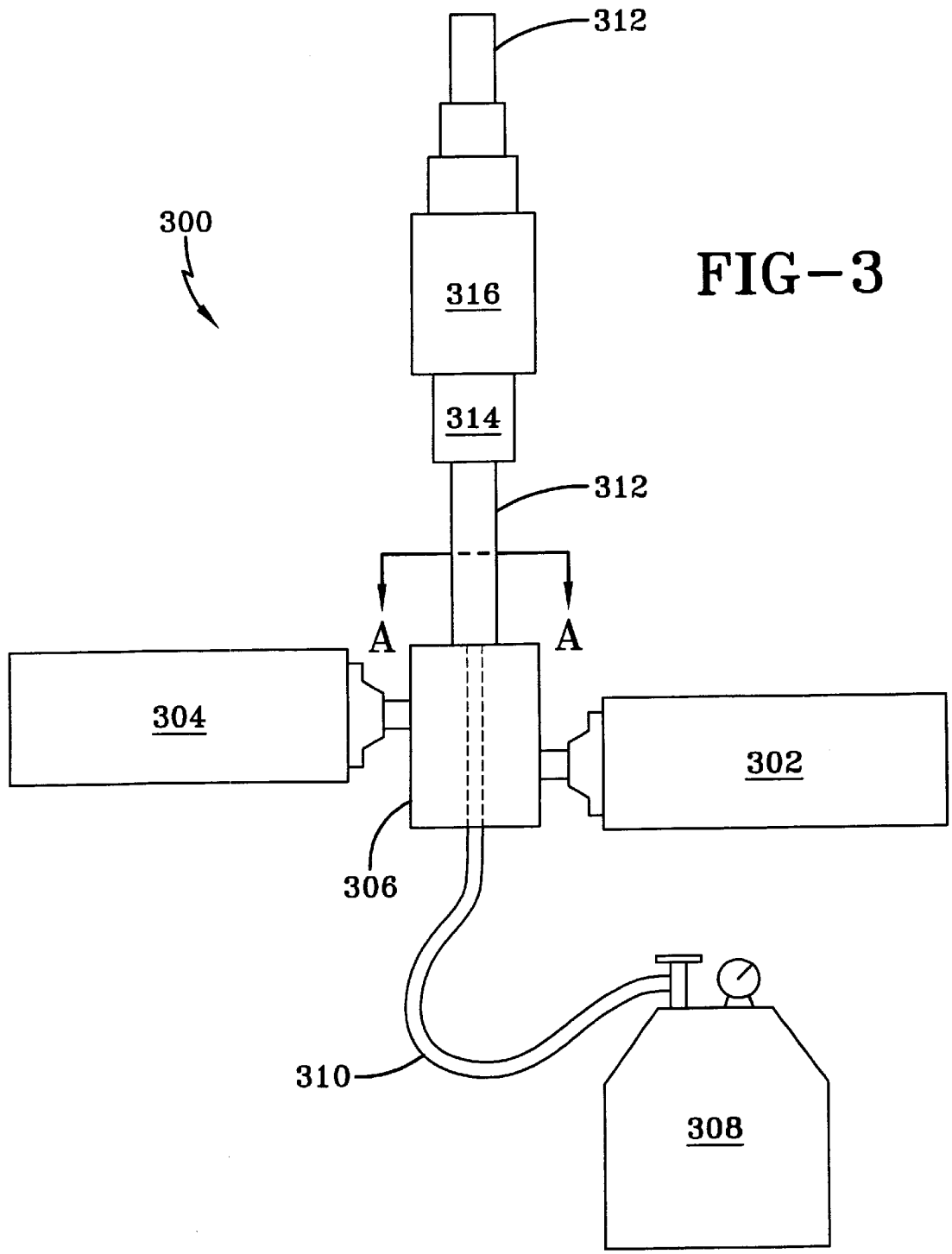
FIG. 3 is an elevation view of one embodiment of a system implementing the present invention.

FIG. 3 shows one example of a system 300 that may utilize the present invention. The system 300 includes an extruder 302 and an extruder 304. In this example, a crosshead die system 306 puts a cap layer from the extruder 304 on the material extruded by the extruder 302. A container 308 may be used to hold a cooling fluid of the present invention. The fluid is used to cool the extruded product or article 312 after it exits the die system 306. In this embodiment, a valve is used to control the release of gas, e.g., vapor, from the fluid. A hose, conduit, tube, or any other suitable transfer device 310 may be used to direct the gas from the container 308 to the desired location for cooling the extruded product 312. For instance, the transfer device 310 in this example extends through the die system 306 so that the gas is released in the hollows of the extruded product 312 after it exits the die system 306. In this manner, the present invention can provide efficient and thorough cooling of the extruded product 312. Moreover, the extruded product 312 may be further introduced into a liquid bath 314, a spray mist chamber 316, and/or any other desired cooling system to achieve additional cooling of the extruded product 312 if desired. Examples of the liquid bath 314 and the spray mist chamber 316 are provided in U.S. Pat. No. 5,827,462.

Figure 4:
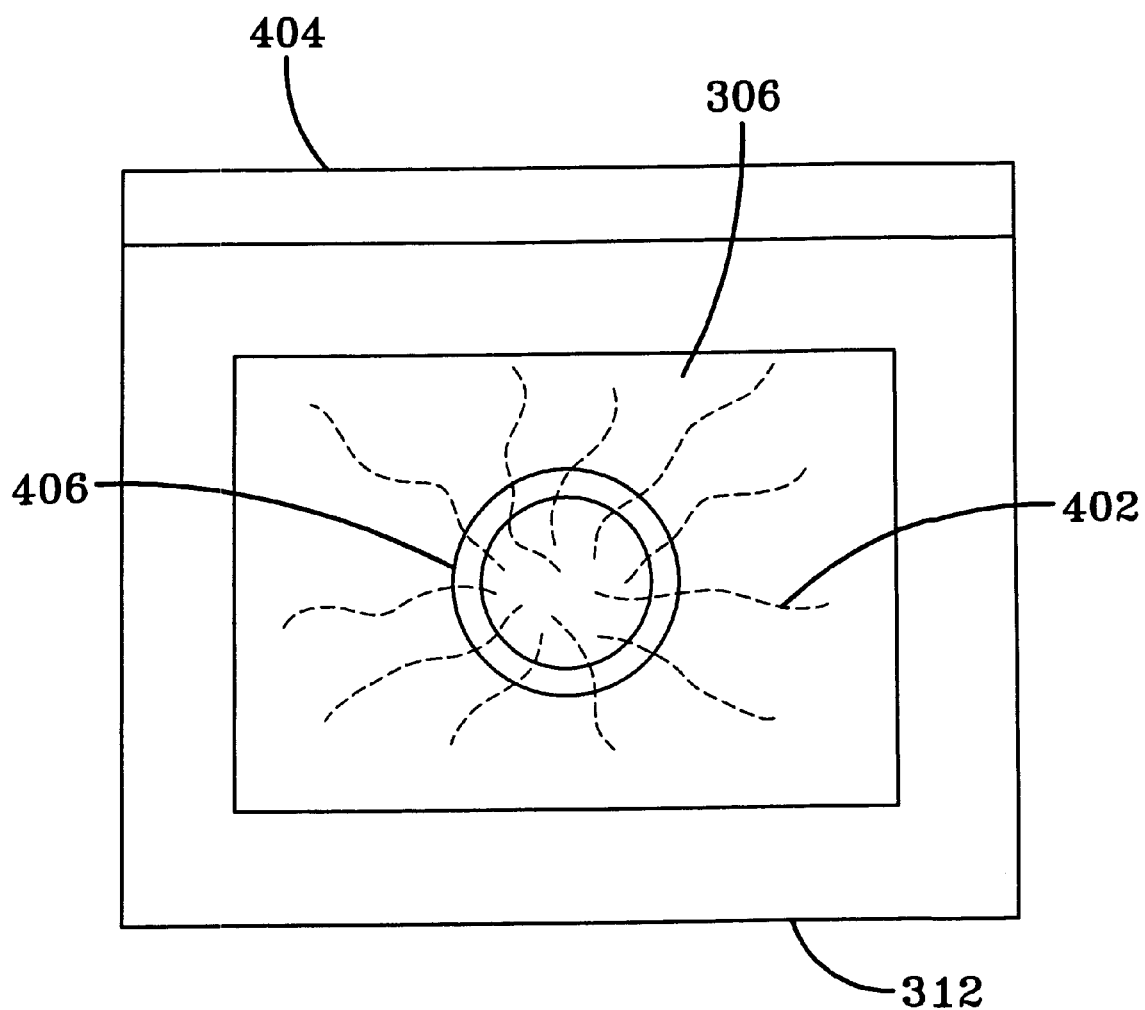
FIG. 4 is a partial cross sectional view along the line A—A of FIG. 3.

FIG. 4 is a cross section view along the line A—A of FIG. 3. The extruded product 312 includes a cap layer 404. The transfer device 310 may extend through the die system 306 to a nozzle 406 that releases gas from the cooling fluid into a hollow of the extruded product 312. In this instance, gas vapor 402 permeates through the hollow of the extruded product 312, thereby providing much improved cooling of the extruded product 312.

It should be recognized that FIGS. 3 and 4 are merely an example of a manufacturing system that may utilize the present invention. As noted above, the present invention may be used in any manufacturing system in which the processed material needs to be cooled to a desired level. For example, the present invention may be used in an extrusion system consisting of a single extruder that is in-line with a die system. Also, the present invention may be used to cool injection molded and compression molded materials.

Figure 5:
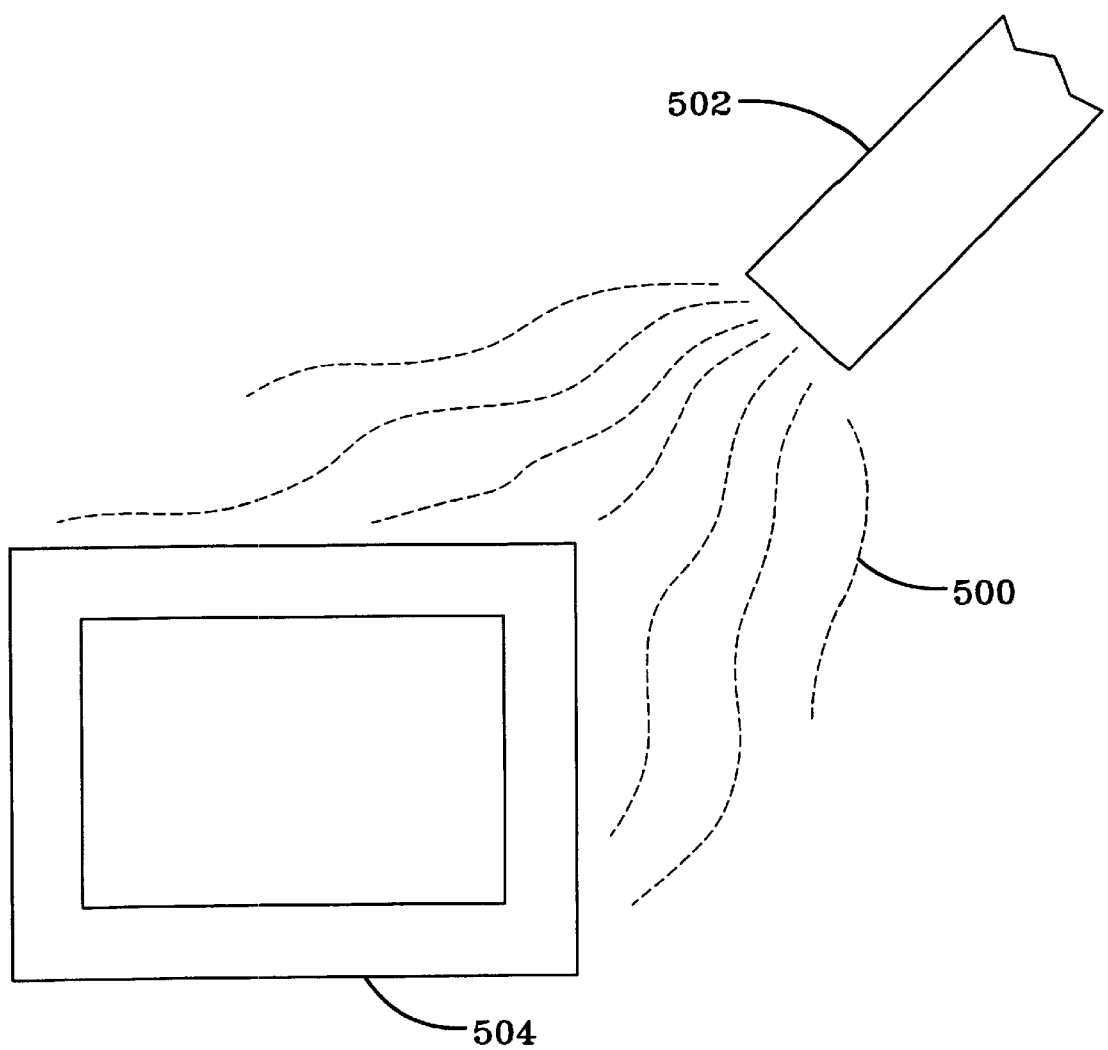
FIG. 5 is a partial elevation view of another embodiment of a system of the present invention.

The gas from the cooling fluid may also be used to cool other portions of the manufactured product. For example, the present invention may be used to cool an exterior portion of the manufactured product. Additionally, the present invention may be used to cool exterior and interior portions of the manufactured product simultaneously. FIG. 5 shows an embodiment in which the gas vapor 500 is dispersed by the transfer device 502 onto the exterior of the product 504.

Figure 6:
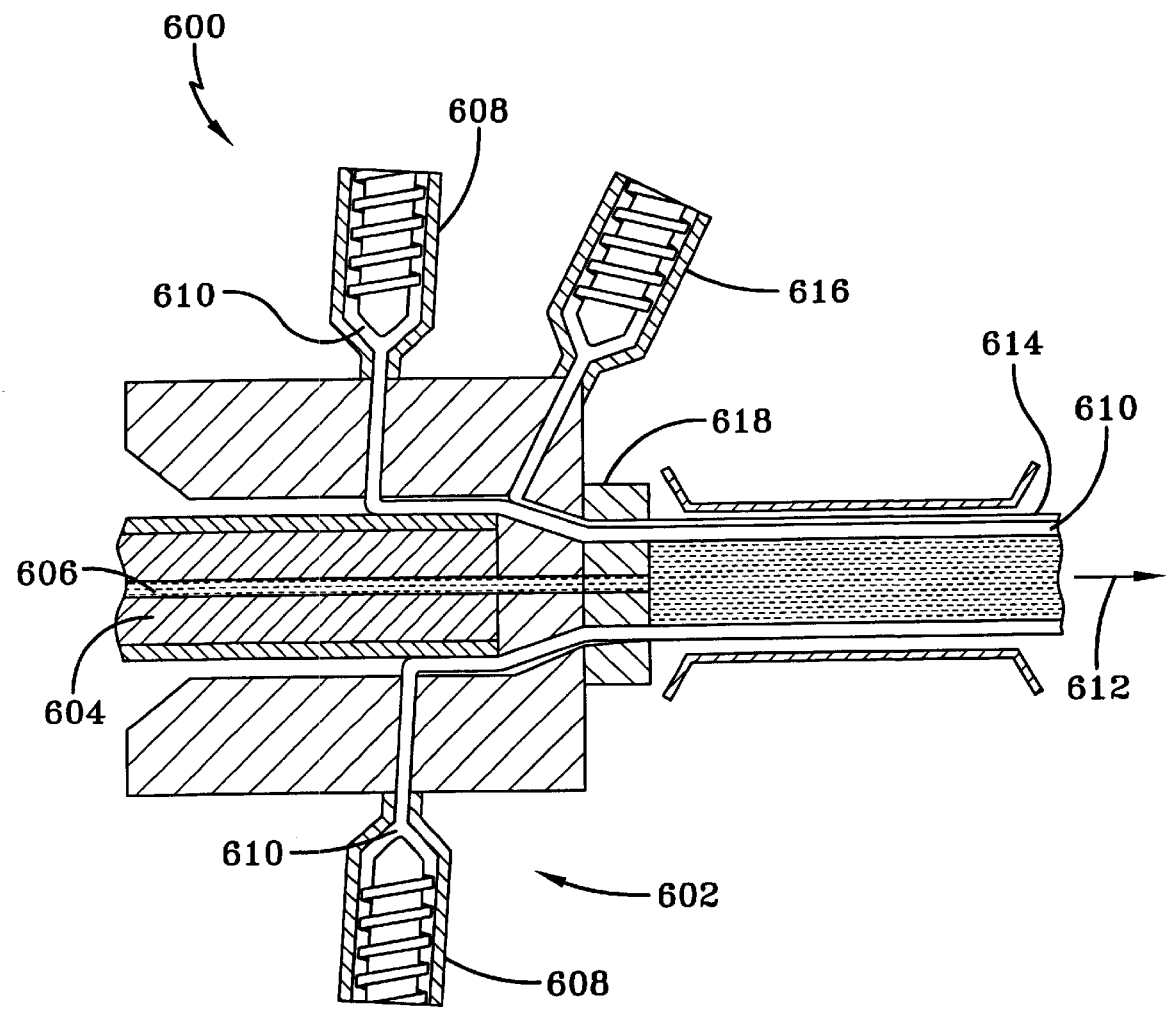
FIG. 6 shows a sectioned schematic of an extruder line used in accordance with the practice of one embodiment of the present invention.

Turning to FIG. 6, this Figure shows a sectioned schematic of an extruder line 600 used in accordance with the practice of one embodiment of the present invention. FIG. 6 shows an extruder line 600 which includes co-extrusion apparatus 602. Co-extrusion apparatus 602 includes insulated transport tube 604 that is adapted to carry cooling fluid 606. The cooling fluid 606 may be gas that is preferably delivered from a supply of cryogenic fluid. Co-extrusion apparatus 602 also includes a cross head extruder 608 which is adapted to prepare the thermoplastic material 610 for extrusion through a die which forms a hollow rectangular profile and urges it along longitudinal direction 612. Further layers of thermoplastic material such as layer 614 may be added through the use of additional extruders such as extruder 616. Such additional layers of thermoplastic material may include layers of material with specific characteristics for exterior use, such as fluoropolymers and PVC having greater of lesser durability and resistance to changes in aesthetic appearance resulting from exposure to weather and environmental/atmospheric conditions, as dictated by the desired end user. The thermoplastic material 610 is formed by the forming die 618 into the desired final shape, such as a rectangular cross-section. The cooling fluid 606 is allowed to expand to fill the hollow space created in thermoplastic material 610. The cooling fluid 606 is at a significantly lower temperature than the surrounding thermoplastic material 610. The cooling fluid 606 cools the thermoplastic material 610, assisting the thermoplastic material adjacent to the hollow space to "skin" or solidify.

Any desired cooling fluid may be used in the present invention. The cooling fluid, e.g., gas or liquid, has a temperature below about 40 degrees Fahrenheit, more preferably below about 32 degrees Fahrenheit. Examples of the cooling fluid are air and water. Another example of the cooling fluid is gas or vapor that is produced from a cryogenic fluid. For instance, a cryogenic fluid may have a temperature below about −250 degrees Fahrenheit. Examples of cryogenic fluids include, but are not limited to, liquid oxygen, liquid nitrogen, liquid neon, liquid hydrogen, liquid helium, and other similar, suitable, or conventional cryogenic fluids.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for cooling a product made from a material, said method comprising:

forcing said material through a die;

directing a gas from a cryogenic fluid through said die; and subjecting said material to said gas as said material exits said die.

2. The method of claim 1 wherein said cryogenic fluid has a temperature below about −250 degrees Fahrenheit.

3. The method of claim 2 wherein said cryogenic fluid is selected from liquid oxygen, liquid nitrogen, liquid neon, liquid hydrogen, and liquid helium.

4. The method of claim 1 wherein said gas is vapor.

5. The method of claim 1 wherein:

said product has an interior surface; and said interior surface is subjected to said gas.

6. The method of claim 5 wherein said interior surface defines a hollow.

7. The method of claim 1 wherein an exterior surface of said product is subjected to said gas.

8. The method of claim 1 wherein said material is forced through said die by extrusion.

9. The method of claim 1 further comprising subjecting said product to a liquid bath.

10. The method of claim 9 wherein said liquid bath is comprised of water.

11. The method of claim 1 wherein said material is selected from the group consisting of cellulosic/polymer composites, plastics, polymers, thermoplastics, foamed plastics, plastic compositions, inorganic-filled plastic compositions, metals, metallic compositions, alloys, and mixtures including any of the aforementioned materials.

12. A method of cooling a product having a hollow portion, said method comprising:

directing a gas from a cryogenic fluid through a die; and subjecting said hollow portion to said gas as said product exits said die.

13. The method of claim 12 wherein said cryogenic fluid has a temperature below about −250 degrees Fahrenheit.

14. The method of claim 13 wherein said cryogenic fluid is selected from liquid oxygen, liquid nitrogen, liquid neon, liquid hydrogen, and liquid helium.

15. The method of claim 12 wherein said gas is vapor.

16. The method of claim 12 further comprising subjecting an exterior surface of said product to said gas.

17. The method of claim 12 further comprising forcing said product out of said die by extrusion.

18. The method of claim 12 further comprising subjecting said product to a liquid bath.

19. The method of claim 12 wherein said product is made from a material selected from the group consisting of cellulosic/polymer composites, plastics, polymers, thermoplastics, foamed plastics, plastic compositions, inorganic-filled plastic compositions, metals, metallic compositions, alloys, and mixtures including any of the aforementioned materials.

* * * * *